(12) United States Patent
    Han et al.

(10) Patent No.: US 10,724,413 B2
(45) Date of Patent: Jul. 28, 2020

(54) METHOD AND CONTROL ASSEMBLY FOR OPERATING AN EXHAUST GAS SYSTEM

(71) Applicant: Daimler AG, Stuttgart (DE)

(72) Inventors: Zhiping Han, Canton, MI (US); Bryant Pham, Canton, MI (US)

(73) Assignee: Dailer AG, Stuttgart (DE)

( * ) Notice: Subject to any disclaimer, the term of this patent is extended or adjusted under 35 U.S.C. 154(b) by 284 days.

(21) Appl. No.: 15/105,764

(22) PCT Filed: Dec. 4, 2014

(86) PCT No.: PCT/EP2014/003243
    § 371 (c)(1),
    (2) Date: Jun. 17, 2016

(87) PCT Pub. No.: WO2015/090521
    PCT Pub. Date: Jun. 25, 2015

(65) Prior Publication Data
    US 2016/0356194 A1  Dec. 8, 2016

(30) Foreign Application Priority Data

Dec. 19, 2013  (GB) .................................. 1322618.8

(51) Int. Cl.
    *F01N 3/20*  (2006.01)
    *B01D 53/94*  (2006.01)
    *B01D 53/90*  (2006.01)

(52) U.S. Cl.
    CPC ............. *F01N 3/208* (2013.01); *B01D 53/90* (2013.01); *B01D 53/9431* (2013.01);
    (Continued)

(58) Field of Classification Search
    CPC ................ B01D 53/90; B01D 53/9431; B01D 53/9495; B01D 2251/2067;
    (Continued)

(56) References Cited

U.S. PATENT DOCUMENTS 6,546,720 B2 * 4/2003 van Nieuwstadt ..... B01D 53/90
                                                 60/286
8,893,475 B2 * 11/2014 Geveci .................... F01N 3/208
                                                 60/274

(Continued)

FOREIGN PATENT DOCUMENTS

EP        2 551 480 A1    1/2013
WO    WO 2008/048175 A1   4/2008
WO    WO 2013/032390 A1   3/2013

OTHER PUBLICATIONS

International Search Report (PCT/ISA/210) issued in PCT Application No. PCT/EP2014/003243 dated Mar. 12, 2015 (Three (3) pages).

(Continued)

*Primary Examiner* — Matthew T Largi
(74) *Attorney, Agent, or Firm* — Crowell & Moring LLP (57) ABSTRACT

A method for operating an exhaust gas system is provided. The method includes determining an amount of a reducing agent to be supplied to the exhaust gas of an engine and evaluating measurements which indicate a content of nitrogen oxides in the exhaust gas downstream of a catalytic device adapted to diminish the content of nitrogen oxides. A magnitude and a frequency of the measurements are taken into account in determining the amount of the reducing agent to be supplied. A plurality of measurements is captured during a predetermined period of time. A magnitude of a measurement captured within this period of time is related to a quantity derived from the respective magnitudes of the plurality of measurements. The related measurement is utilized to determine the amount of the reducing agent to be supplied. A control assembly for operating an exhaust gas system is also provided.

16 Claims, 5 Drawing Sheets

(52) U.S. Cl.
CPC ....... *B01D 53/9495* (2013.01); *F01N 3/2066* (2013.01); *B01D 2251/2067* (2013.01); *B01D 2255/911* (2013.01); *F01N 2550/05* (2013.01); *F01N 2560/02* (2013.01); *F01N 2560/026* (2013.01); *F01N 2900/0418* (2013.01); *F01N 2900/1402* (2013.01); *Y02A 50/2325* (2018.01); *Y02T 10/24* (2013.01)

(58) Field of Classification Search
CPC . B01D 2255/911; F01N 3/2066; F01N 3/208; F01N 2550/05; F01N 2560/02; F01N 2560/026; F01N 2900/0418; F01N 2900/1402; Y02A 50/2325; Y02T 10/24
See application file for complete search history.

(56) References Cited

U.S. PATENT DOCUMENTS 9,856,771 B2 * 1/2018 Ota .................... F01N 3/208

| 2002/0148220 | A1* | 10/2002 | Patchett | B01D 53/90 60/286 |
|---|---|---|---|---|
| 2005/0287034 | A1* | 12/2005 | Wills | F01N 3/2066 422/52 |
| 2009/0165543 | A1 | 7/2009 | Wakahara | |
| 2010/0024390 | A1* | 2/2010 | Wills | F01N 3/106 60/274 |
| 2011/0005202 | A1* | 1/2011 | Gady | F01N 3/208 60/276 |
| 2011/0252767 | A1* | 10/2011 | Lin | F01N 3/208 60/274 |
| 2013/0140383 | A1 | 6/2013 | Thomas et al. | |

OTHER PUBLICATIONS

Written Opinion (PCT/ISA/237) issued in PCT Application No. PCT/EP2014/003243 dated Mar. 12, 2015 (Six (6) pages).
Search Report issued in counterpart Great Britain Application No. GB1322618.8 dated Aug. 13, 2014 (Three (3) pages).

* cited by examiner

METHOD AND CONTROL ASSEMBLY FOR OPERATING AN EXHAUST GAS SYSTEM

BACKGROUND AND SUMMARY OF THE INVENTION

The invention relates to a method for operating an exhaust gas system, in particular of a vehicle, in which an amount of a reducing agent to be supplied to the exhaust gas of an engine is determined. To determine this amount measurements are evaluated, which indicate a content of nitrogen oxides in the exhaust gas downstream of a catalytic device. The catalytic device is adapted to diminish the content of nitrogen oxides in the exhaust gas. In determining the amount of the reducing agent be supplied to the exhaust gas, a magnitude and a frequency of the measurements are taken into account. Furthermore the invention relates to a control assembly for operating an exhaust gas system.

Today's vehicle engines, in particular diesel engines, are generally equipped with an aftertreatment system to meet stringent tail pipe emissions and on board diagnosis (OBD) regulations. The aftertreatment system or exhaust gas system usually includes a catalytic device such as a selective catalytic reduction (SCR) catalyst which is adapted to reduce the engine emitted pollutant NOx. In such an SCR catalyst nitrogen oxides react with a reducing medium in the form of ammonia ($NH_3$) in a selective catalytic reduction reaction. The product of the reaction is nitrogen and water. The supply of ammonia into the exhaust gas can be achieved by injecting a so called diesel exhaust fluid (DEF) as a reducing agent, which is a urea-water solution with 32.5% urea. The injected diesel exhaust fluid then releases ammonia through a hydrolysis reaction after being mixed with the hot exhaust gas. Another way to supply the reducing agent to the exhaust gas is to inject ammonia in the gaseous phase directly into the exhaust gas.

Ammonia molecules are first adsorbed or stored on the surface of the SCR catalyst's coating which may consist of zeolite. The ammonia than reacts with NOx on the surface and converts to non-hazardous forms ($N_2$ and $H_2O$). The amount of ammonia supplied to the SCR plays a dominant role in the catalyst's NOx conversion efficiency. The optimal amount of ammonia supplied should match not only inflowing NOx, but also maintain a certain ammonia storage level, so as to result in the highest NOx conversion efficiency.

The amount of supplied ammonia can, however, deviate from the optimal amount due to various reasons. Some of the major reasons causing insufficient ammonia supply include the dilution of the diesel exhaust fluid with water, a certain degree of blockage of a dosing unit adapted to inject the diesel exhaust fluid into the exhaust gas and erroneously low sensor readings of the inflowing NOx, i.e., a false detection of the nitrogen oxide content upstream of the catalytic device. If ammonia is under-supplied, the SCR becomes less effective and the tail pipe NOx emissions will increase.

With tightened regulations regarding NOx emissions and on-board diagnosis issues, maintaining an optimal ammonia supply is critically important to assure the compliance of both emissions and OBD.

One way to obtain the amount of ammonia to be supplied to the exhaust gas is to use an ammonia sensor. However, the introduction of an additional sensor will not only increase the cost of the exhaust gas system and provide for additional OBD requirements, but also additional part failure can occur. The warranty risks associated with such part failure are also to be considered.

Using an ammonia sensor provides for collectively detecting an insufficient reducing agent supply level which is caused by multiple deviation sources. However, as mentioned above the drawbacks to this are added hardware costs, added OBD requirements, added part failure modes and increased warranty related cost risks.

Document US 2011/0005202 A1 describes an exhaust gas system with a first sensor located upstream of an SCR catalyst and a second sensor located downstream of the SCR catalyst. The frequencies and the magnitudes of the signals or measurements provided by the NOx sensor located downstream of the SCR catalyst are compared to the frequencies and magnitudes of the signals provided by the upstream sensor. Based on a comparison of the frequencies and magnitudes the ammonia storage level of the SCR catalyst is determined. Thus, the conversion efficiency of the SCR catalyst is monitored.

Document WO 2008/048175 A1 describes a method for monitoring the functioning of an exhaust gas aftertreatment system of a motor vehicle based on a measuring signal from a sensor located downstream of a catalyst. The signal provided by the sensor represents the NOx content in the exhaust gases flowing out of the catalyst. A frequency analysis of the measuring signal provided by the sensor is performed during a certain period of time. Thus, an evaluation value is established, which reflects the character of a frequency part of the measuring signal provided by the sensor during this period of time. Information regarding the functioning of the exhaust gas aftertreatment system is generated based on this evaluation value.

However these methods are prone to false determinations of the amount of reducing agent to be supplied to the exhaust gas under some circumstances.

It is therefore an object of the present invention to provide a method and a control assembly of the initially mentioned kind, which is particularly reliable in determining the amount of the reducing agent to be supplied to the exhaust gas.

In the method according to the invention a plurality of measurements are captured during a predetermined period of time. A magnitude of a measurement captured within this predetermined period of time is related to a quantity which is derived from the respective magnitudes of the plurality of measurements captured during the predetermined period of time. The related measurement is then utilized to determine the amount of the reducing agent to be supplied to the exhaust gas. As the measurement is related to the quantity, a relative magnitude-frequency analysis is utilized instead of an absolute magnitude-frequency analysis. Thus, a particularly high detection resolution is achieved with either a new or fresh catalytic device or an aged catalytic device.

The method provides a real time on-board diagnostic detection tool without a physical ammonia sensor to detect if the ammonia or such a reducing agent has been insufficiently supplied. Thus, the dosing amount can be adjusted accordingly. Therefore insufficient supply of the reducing agent to the catalytic device can be detected by utilizing the existing tail pipe NOx sensor signal or measurement.

One of the major advantages of this method is its capability to collectively detect an ammonia supply insufficiency caused by multiple small deviations from various sources which each alone may not be detectable. This is based on the finding that for an individual detection of deviation sources a dilution of the reducing agent would need to be detected as well as a too high or too low delivery quantity of the reducing agent or a nitrogen oxide sensor reading drift which is high or low. If it is intended to detect such individual deviation sources the drawback is that this may not give an accurate total effect of the reducing agent supply level when adding up all the deviation sources detected. This might be the case if the detection resolution is poor at one of the deviation source detection sites.

For example, the detection of a NOx drift in the exhaust gas leaving the engine has today a poor resolution or accuracy. This low resolution is a hurdle in making a reducing agent control compensation adjustment. As the present method allows to detect the individual deviation sources collectively, the detection resolution is increased. Thus, the method is particularly reliable in determining the amount of the reducing agent to be supplied to the exhaust gas.

The method provides a solution to control the amount of reducing agent actually supplied to a catalytic device such as an SCR catalyst to be maintained always at an optimal level even under various hardware related deficiency and malfunction conditions. By detecting an insufficiency in the amount of the reducing agent supplied to the exhaust gas on-board and by adjusting the dosing control, actual dosing errors caused by such deficiencies and malfunctions can be compensated for. Thus, a particularly low tail pipe nitrogen oxide emission level can be achieved and maintained, and OBD fault occurrences can be avoided. Furthermore the costs for using a physical sensor adapted to detect the amount of the reducing agent supplied to the exhaust gas can be avoided.

A particularly easy way to take into account the respective magnitudes of the plurality of measurements captured during the predetermined period of time is to utilize an average or a median of the magnitudes of the plurality of measurements. Thus, a variation of the absolute magnitude of the measurements does not have an unwanted influence on the determination of the amount of the reducing agent being supplied to the exhaust gas. For example, an aged catalytic device with a sufficient supply of reducing agent will not be mistakenly detected as an insufficient supply of the reducing agent.

In a further advantageous embodiment a moving median is utilized as the quantity. The moving median takes into account a series of predetermined periods of time. In a particularly simple configuration the moving median is a mathematic average of the magnitudes of the plurality of measurements which are symmetrically arranged around the measurement or value to be related to the moving median. Thus, the influence of an overall trend of the measurement magnitudes can be detected and is not falsely interpreted as an inappropriate amount of the reducing agent supplied to the exhaust gas.

Thus, utilizing the moving median as the quantity further enhances the reliability of the determination of this amount.

It has further proven to be advantageous if in relating the measurement to the quantity a difference between the magnitude of the measurement to be related and the quantity is calculated. By taking into consideration this difference, the noise of the measurements or signals is detected. This is based on the finding that the quantity of the reducing agent stored in the catalytic device has a damping effect on sudden variations in inflowing nitrogen oxides, in particular on sudden increases of inflowing nitrogen oxides. If the level of reducing agent stored in the catalytic device is reduced or if there is no stored reducing agent left at all, the reduced damping capacity to the inflowing nitrogen oxide variations results in the noisiness of the tail pipe nitrogen oxide sensor's signal. Therefore, by taking into account the noisiness a degree of shortage in the amount of the reducing agent supplied to the catalytic device can be readily detected.

Further advantageously a total of absolute values of differences is created in utilizing the related measurement to determine the amount of the reducing agent to be supplied to the exhaust gas. Such a total of absolute values is particularly easy to handle and has proven to be a very robust detection tool.

Herein, it has appeared advantageous if for the total a lower threshold and an upper threshold are defined. Then the amount of the reducing agent to be supplied to the exhaust gas is varied if the total is below the lower threshold or above the upper threshold. Thus, a closed-loop control to adjust the amount of the reducing agent supplied to the exhaust gas can be particularly easily implemented.

The adjustments made to the dosing of the reducing agent can in particular be performed by a PID controller (proportional-integral-derivative controller). This provides for a particularly cheap and flexible implementation.

Preferably the lower threshold is above zero. Thus, an overdosing scenario can be avoided. This is based on the finding that with a lower threshold of zero or very near to zero it is difficult to tell whether the reducing agent is oversupplied or not.

It has therefore proven to be advantageous, if as the lower threshold a value between 0.1 and 1, in particular between 0.3 and 0.8 and as the upper threshold a value between 0.9 and 1.5, in particular between 1 and 1.4 are defined. Such values have shown very good capability in responding to a change in the supply of the reducing agent and in maintaining the right supply level of the reducing agent. This is in particular true, if the lower threshold value is between 0.4 and 0.6 and the upper threshold value between 1.2 and 1.3.

A particularly safe determination of the amount of the reducing agent to be supplied to the exhaust gas is achieved, if the total of absolute values of differences is created over a sampling period which is a multiple of the predetermined period of time. The sampling period can therefore in particular be in the range of 2 minutes to 20 minutes, preferably in the range of 5 minutes to 15 minutes. A particularly good result in maintaining a correct level of reducing agent supply is achieved, if the sampling period is about 10 minutes.

Finally it is proven advantageous if the predetermined period of time is in the range of 5 seconds to 60 seconds, in particular in the range of 10 seconds to 30 seconds. This is based on the finding that a period of time which is too short may result in an inability to reliably detect an insufficiency in the dosing of the reducing agent. If, however, the predetermined period of time is too long, the sensitivity for noise detection is decreased. Therefore, the length of the predetermined period of time can in particular be about 20 seconds.

The control assembly according to the invention for operating an exhaust gas system includes a dosing unit which is adapted to supply an amount of a reducing agent to the exhaust gas of an engine. The control assembly further includes an evaluation unit which is adapted to evaluate measurements which indicate a content of nitrogen oxides in the exhaust gas downstream of a catalytic device of the exhaust gas system. The catalytic device is adapted to diminish the content of nitrogen oxides in the exhaust gas. The evaluation unit is adapted to take into account a magnitude and a frequency of the measurements in determining the amount of the reducing agent to be supplied by the dosing unit. Herein the evaluation unit is adapted to capture a plurality of measurements during a predetermined period of time, to relate a magnitude of a measurement captured within this period of time to a quantity which is derived from the respective magnitudes of the plurality of measurements captured during the predetermined period of time. The evaluation unit is further adapted to utilize the related measurement in order to determine the amount of the reducing agent to be supplied to the exhaust gas by the dosing unit.

Such a control assembly provides for a particularly reliable determination of the amount of the reducing agent which shall be introduced into the exhaust gas by the dosing unit.

The advantages and preferred embodiments described for the method according to the invention also apply to the control assembly according to the invention and vice versa.

The features and feature combinations mentioned above in the description as well as the features and feature combinations mentioned below in the description of figures and/or shown in the figures alone are usable not only in the respectively specified combination but also in other combinations or alone without departing from the scope of the invention. Thus, implementations not explicitly shown in the figures or explained, but which result and can be generated by separated feature combinations of the explained implementations are also to be considered encompassed and disclosed by the invention.

Further advantages, features and details of the invention are apparent from the following description of preferred embodiments as well as based on the drawings.

DETAILED DESCRIPTION OF THE DRAWINGS

Figure 1:
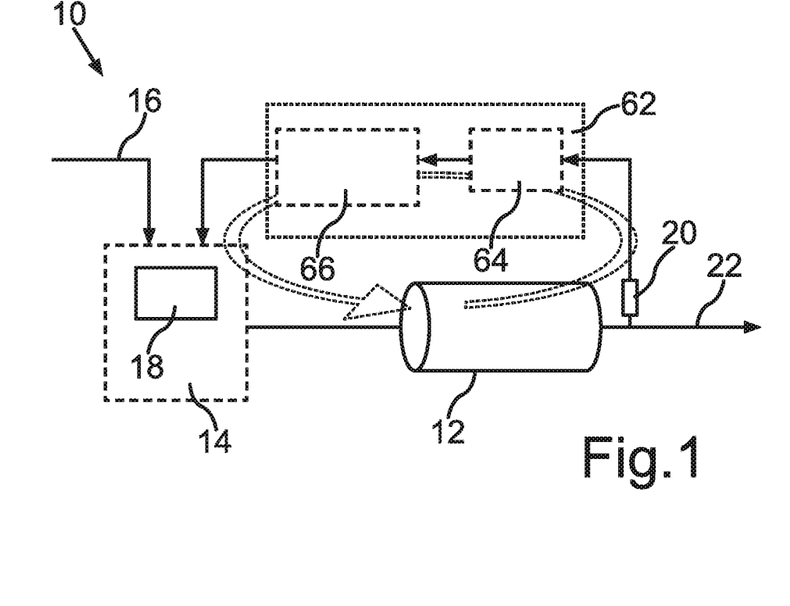
FIG. 1 is a control assembly for operating an exhaust gas system, in which an evaluation unit evaluates signals of a NOx sensor to adjust the amount of a urea-water-solution supplied into the exhaust gas upstream of an SCR catalyst.

FIG. 1 shows a control assembly 10 for operating an exhaust gas system of a vehicle. Exhaust gas from an engine (not shown) is treated in a catalytic device in the form of an SCR catalyst 12. In the SCR catalyst 12 ammonia ($NH_3$) reacts with nitrogen oxides NOx in the exhaust gas in a selective catalytic reduction (SCR) reaction to form nitrogen and water. A reducing agent in the form of a urea-water solution is injected to the exhaust gas upstream of the SCR catalyst 12 by a dosing unit 14. The urea-water solution which is also called diesel exhaust fluid (DEF) releases the ammonia in a hydrolysis reaction after being mixed with the hot exhaust gas.

Input signals 16 are provided to a controller 18 of the dosing unit 14 depending on engine operating parameters. The control assembly 10 is designed to detect insufficient ammonia supply to the SCR catalyst 12 and to closed-loop control the dosing of the diesel exhaust fluid or such a reducing agent into the exhaust gas.

The closed-loop control is based on a magnitude-frequency analysis of signals or measurements provided by a NOx sensor 20 which measures the NOx concentration in ppm (part per million) in a tail pipe 22. The tail pipe 22 is a section of an exhaust gas pipe of the exhaust gas system, which is located downstream of the SCR catalyst 12. The analysis looks at the magnitude and frequency of the NOx sensor's 20 signal reading and, thus, of the measured NOx concentration downstream of the SCR catalyst 12.

If the SCR catalyst's 12 ammonia supply is sufficient and within a normal range, the tail pipe 22 NOx sensor's 20 signal reading is generally low and smooth because of a good NOx conversion efficiency of the SCR catalyst 12. With the right amount of ammonia supplied to the SCR catalyst 12, not only the SCR catalyst 12 will have good NOx conversion, but more importantly, there will be extra ammonia stored in the SCR catalyst 12. This stored ammonia provides a damping effect by maintaining good conversion when there is a sudden increase of inflowing NOx or when there are sudden NOx fluctuations. The stored ammonia thus maintains a smooth tail pipe 22 NOx output. The more ammonia that is stored in the SCR catalyst 12 the better is the damping effect and the smoother the tail pipe NOx output.

If there is a shortage in the amount of ammonia supplied to the SCR catalyst 12, the level of the stored ammonia is reduced. If short supply gets severe enough, there is no stored ammonia left in the SCR catalyst 12 at all. Under such conditions, due to the reduced damping capacity, with an inflowing NOx variation, the tail pipe NOx sensor's 20 signal reading becomes noisy. Magnitude and frequency of the noise increases with the increased degree of shortage in ammonia supply.

Figure 2:
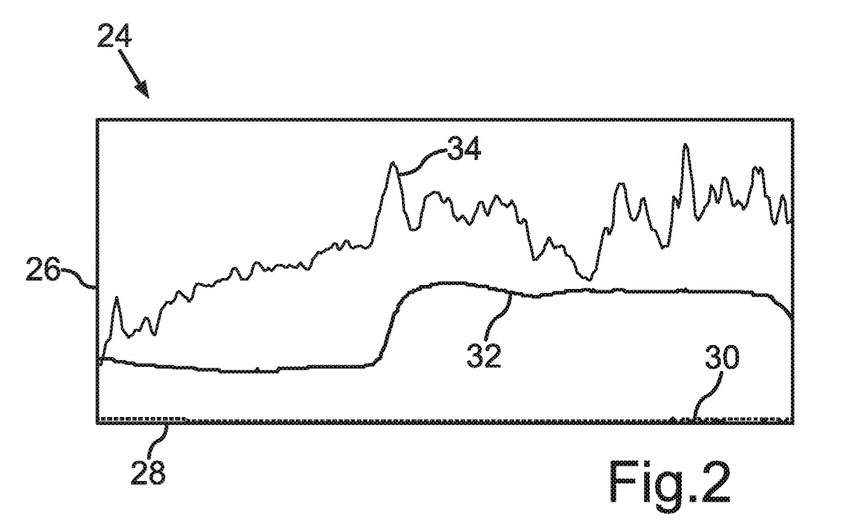
FIG. 2 illustrates three curves indicating the NOx concentration downstream of the SCR catalyst for three different scenarios.

FIG. 2 shows a graph 24 in which an ordinate 26 indicates the NOx concentration in ppm in the tail pipe 22. On an abscissa 28 the time in seconds is indicated. A first curve 30 shows the measurements provided by the NOx sensor 20 when the SCR catalyst 12 is comparatively new or fresh and the ammonia supply is within a normal range. According to the curve 30 the tail pipe 22 NOx level is low and the signal is smooth. A second curve 32 shows the tail pipe 22 NOx concentration for an aged SCR catalyst 12 with normal ammonia supply. The tail pipe 22 NOx level is overall high but the signal is still relatively smooth. A third curve 34 shows the tail pipe 22 NOx signal if the ammonia supplied to the fresh SCR catalyst 12 is reduced. Accordingly, the tail pipe 22 NOx signal becomes both higher and noisier.

This general behavior of the NOx sensor's 20 signal reading is utilized to detect the SCR catalyst's 12 ammonia supply condition. In other words the tail pipe 22 NOx sensor 20 signal's magnitude and frequency characteristics are analyzed to detect underdosing or overdosing of ammonia into the exhaust gas. The detected magnitude-frequency analysis result is utilized to adjust the dosing control in a closed-loop approach accordingly and brings it back to a normal level if ammonia supply deviates from a normal level to either the rich or the lean side.

Thus, the reducing agent supply can be changed to a limit without notifying a driver of the vehicle. The reason is that insufficient ammonia supply could be partially caused by a hardware malfunction which could lead to increased warranty costs if investigated, even though the malfunction is tolerable. If the supply increases above the limit, the driver can be notified, for example by a check engine light. The limit is based on the degree of tolerable malfunction of the exhaust gas aftertreatment system without damaging the system hardware.

A measurement tool for evaluating the level or amount of ammonia supplied to the SCR catalyst 12 is an integrated quantity which is called "lumped average relative magnitude-frequency" or in short LARMF. The LARMF is expressed below:

$$LARMF = \frac{1}{\tau}\int_0^\tau |(x_i - \tilde{x}_s)|\, dt$$

where $x_i$=the tail pipe NOx sensor's 20 signal at data sampling time point "i"

$\tilde{x}_s$=the signal's moving median at time "i" for "s" sampling time period $\tau$=the total time period of data sampling.

The LARMF quantity uses relative magnitude-frequency analysis instead of absolute magnitude-frequency analysis. Specifically the measurement $x_i$ is related to a quantity $x_s$, which is the moving median at time point "i" for a predetermined period of time or sampling time period "s". The utilization of this relative magnitude-frequency analysis results in a high detection resolution with either a fresh SCR catalyst 12 or an aged SCR catalyst 12.

The moving median $x_i$ is a virtual signal. The moving median $x_i$ depends on the length of the predetermined period of time and thus on the number of measurements taken within this period of time. The moving median $x_i$ can for example be the mathematic average of s data points or measurements which are symmetrically arranged around the measurement $x_i$. The moving median calculation is arbitrary in the sense that the median value depends on how many measurements are used, i.e., how the predetermined period of time is selected. A larger predetermined period of time makes LARMF bigger and vice versa. If the sampling time period is too small, LARMF will be too small to reliably detect insufficient dosing of ammonia to the exhaust gas.

However if the predetermined period of time is too long and thus "s" is too large, this may lead to a LARMF value that is too big, if the SCR catalyst 12 is aged. A proper selection of the sampling period of time and thus the median averaging the measurements within this period of time is important in order to have both good ammonia supply level detection resolution and good separation from the impact of aging on the SCR catalyst 12. In other words, a good selection of the predetermined period of time and thus the number of measurements taken within this period of time should result in a LARMF value which is large enough to detect an ammonia supply insufficiency, but which is still small enough, if aged SCR catalyst 12 is monitored. The relative properties of the LARMF value include the utilization of an integration function which is constructed by the difference between the signal or measurement $x_i$ and its moving median $x_s$ instead of the signal's absolute magnitude.

Figure 3:
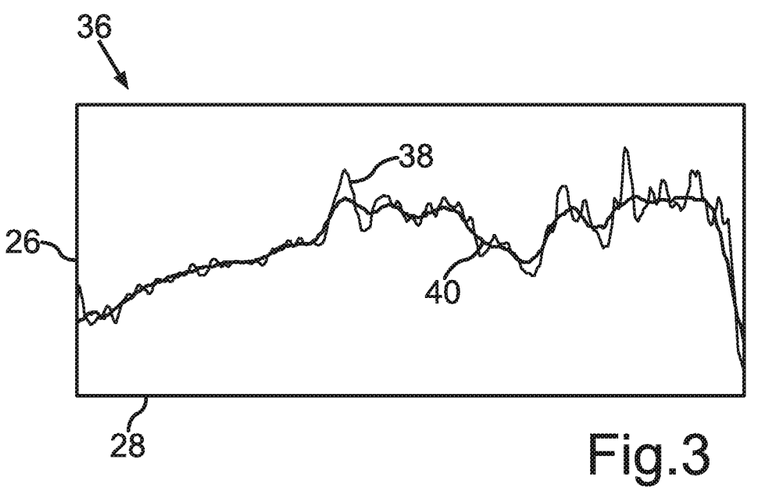
FIG. 3 illustrates curves showing an example of the signal of the NOx sensor and a moving median for a scenario with insufficient supply of ammonia to the SCR catalyst.

In another graph 36 in FIG. 3 again the tail pipe 22 NOx concentration in ppm is shown on the ordinate 26 and the time in seconds on the abscissa 28. A curve 38 shows the signal $x_i$ and a curve 40 is a plot of the corresponding moving median $x_s$.

Figure 4:
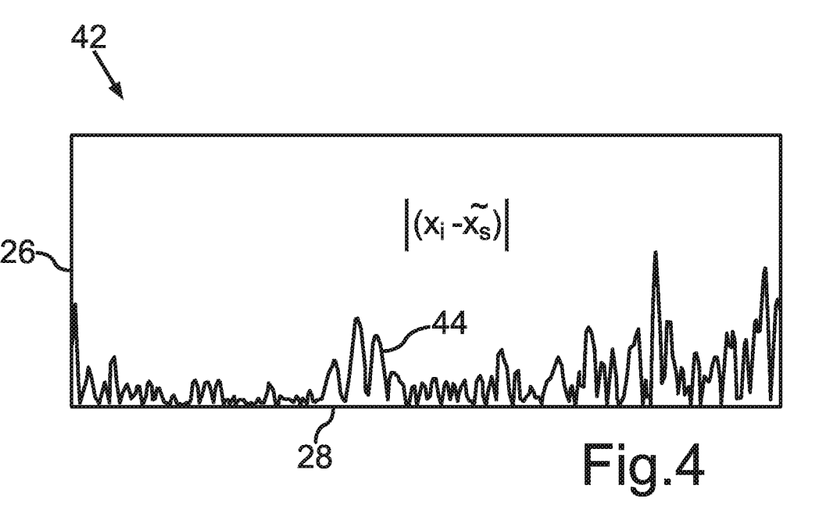
FIG. 4 illustrates a curve which shows total values of the differences between the signal and the moving median curve shown in FIG. 3.

FIG. 4 shows another graph 42 in which a curve 44 visualizes the integration function, i.e., the relative magnitude-frequency term utilized in the LARMF equation. This integration function represents the absolute values of the differences between the measurement $x_i$ and the moving median $x_s$. The LARMF value is than a sum or total of all these absolute values collected over the sampling period $\tau$.

For an aged SCR catalyst 12 the tail pipe 22 NOx signal's absolute magnitude is high but relatively smooth, if the SCR catalyst 12 is supplied with sufficient ammonia. Thus, the difference between the signal $x_i$ and its moving median $x_s$ will be very small, although the signal's absolute magnitude is high. As a consequence the integration function in the LARMF equation is very small too, and the resulting LARMF value is also very small.

Thus, an aged SCR catalyst 12 with a normal amount of ammonia supplied to the exhaust gas will not be mistakenly detected as an ammonia short supply case since the LARMF value is very small.

Figure 5:
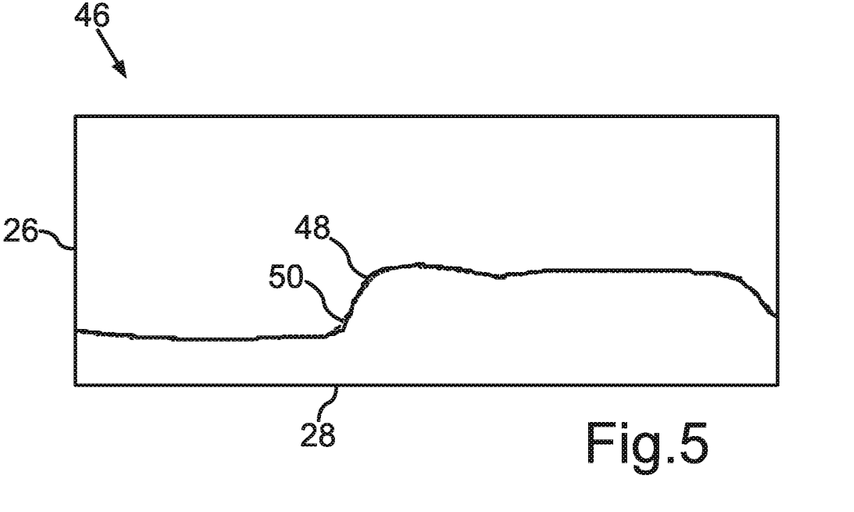
FIG. 5 illustrates curves showing a signal of the NOx sensor and the moving median for an aged SCR catalyst with normal ammonia supply.
Figure 6:
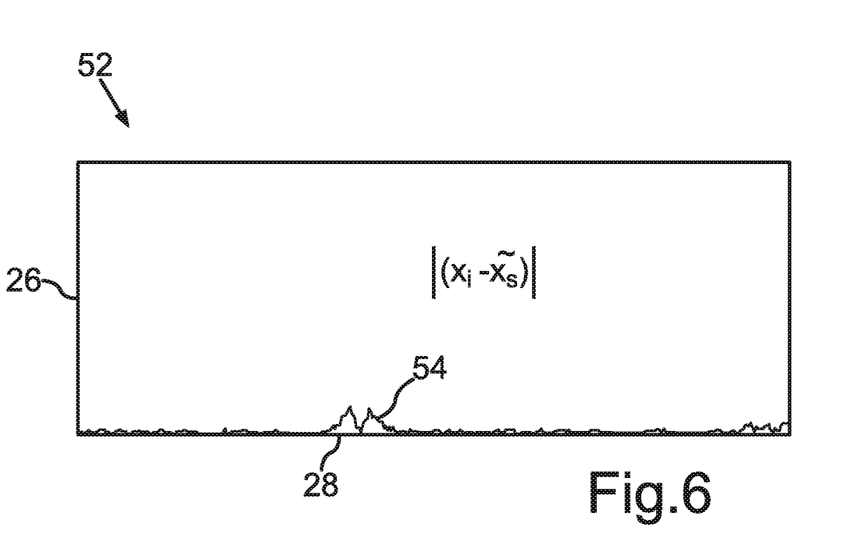
FIG. 6 illustrates a curve showing the absolute values of differences between the signal and the moving median curve of FIG. 5.

A corresponding scenario is illustrated in FIG. 5 and FIG. 6. A graph 46 in FIG. 5 shows a plot in the form of a curve 48 representing the NOx tail pipe 22 concentration measurement of an aged SCR catalyst 12. Another curve 50 represents the corresponding moving median. Even though the absolute magnitude of the signals represented by the curve 48 is rather high, the signal is very smooth and does almost not deviate from the moving median. This is visualized in another graph 52 in FIG. 6, in which a curve 54 indicates the integration function.

For a fresh SCR catalyst 12 with normal ammonia supply the tail pipe 22 NOx signal is low and smooth. However, even if the signals absolute magnitude changes and is high or low, this has little impact on the LARMF value. On the other hand the smoothness and thus the frequency of the signal does have an impact on the LARMF value. As a consequence as long as the ammonia supply is normal both a fresh and an aged SCR catalyst 12 will exhibit a smooth tail pipe 22 NOx signal. Hence, both SCR catalysts 12 will result in a small LARMF value.

Figure 7:
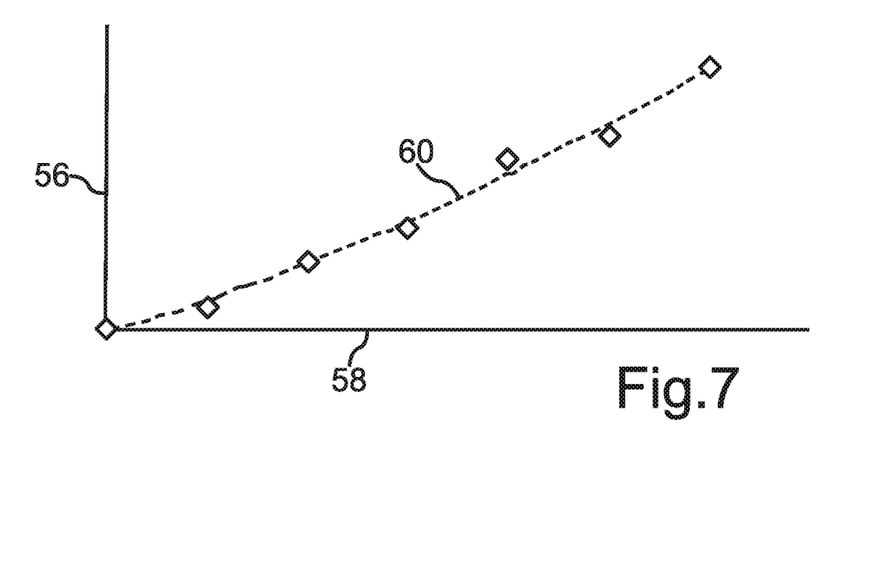
FIG. 7 is a qualitative relationship between a quantity derived from curves like those shown in FIG. 4 and FIG. 6 and an insufficient supply of ammonia to the exhaust gas.

There is a correlation between the LARMF value and the ammonia supply level which can be established through experimental tests. In general a higher degree of ammonia insufficiency corresponds to a larger LARMF value. This general relationship is illustrated by FIG. 7. The LARMF value is indicated on an ordinate 56, whereas a reduction of the ammonia supply compared to a normal supply in percent is indicated on an abscissa 58.

A correlation curve 60 illustrates the aforementioned relationship.

With reference to FIG. 1 an evaluation unit 62 of the control assembly 10 includes a calculation unit 64 which determines the LARMF value based on the NOx signals or measurements provided by the NOx sensor 20. The evaluation unit 62 also includes a dosing compensation logic 66. With this dosing compensation logic 66 the evaluation unit 62 provides dosing adjustment information to the controller 18 of the dosing unit 14. Thus, a closed-loop control utilizing the LARMF value is established. With this closed-loop control even under tightened emission regulations and OBD (on-board diagnosis) regulations an optimal ammonia supply may be maintained which is critically important to assure compliance with both emission and OBD regulations.

The theoretical minimum LARMF value is zero. However the control assembly 10 should be able to avoid an overdosing scenario. With a LARMF value near zero it is difficult to tell, whether the ammonia is oversupplied or not. Therefore, the LARMF value is preferably kept within a certain range above zero. This allows assuring that the ammonia dosing stays optimal.

Figure 8:
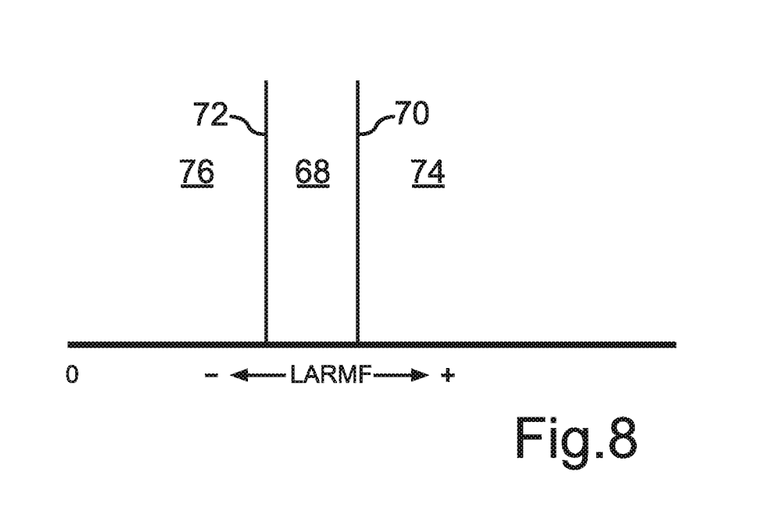
FIG. 8 illustrates zones for a closed-loop ammonia dosing control strategy.

For example, the LARMF based closed-loop dosing control may include three zones as shown in FIG. 8. A first dosing holding zone 68 is bordered by an upper threshold 70 or high LARMF limit and a lower threshold 72 or low LARMF limit. If the LARMF value is above the upper threshold 70 and therefore greater than the holding zone 68 high limit, a positive ammonia dosing adjustment is fed to the controller 18. The dosing adjustment can in particular be incremental. A positive dosing change will push the LARMF value gradually into the holding zone 68 and the controller 18 will then hold to whatever the dosing level is. If the LARMF value is below the lower threshold 72 and thus smaller than the holding zone 68 low LARMF limit, ammonia dosing will be reduced to push the LARMF to the holding zone 68. The LARMF based closed-loop ammonia dosing control strategy thus includes an increasing dosing zone 74 and a decreasing dosing zone 76 (see FIG. 8). The LARMF value target zone or holding zone 68 can in particular be between 0.5 and 1.25.

Figure 9:
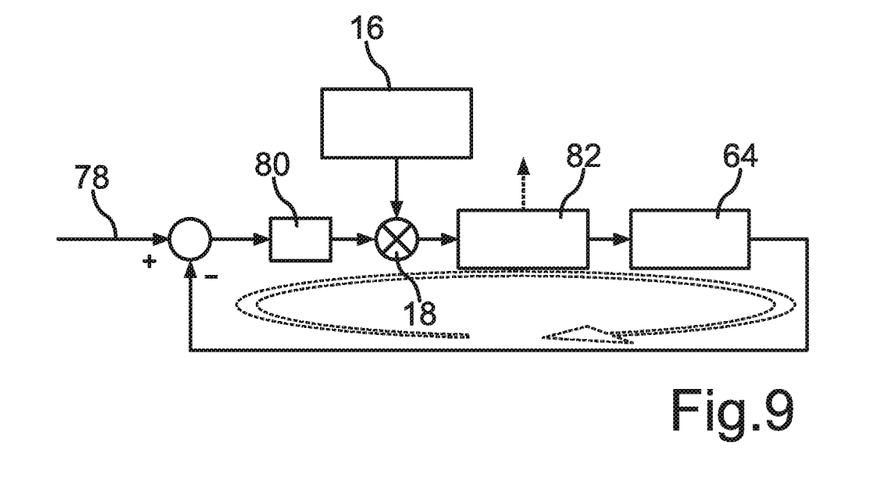
FIG. 9 is a schematic view of a logic structure of the closed-loop dosing control strategy.

The LARMF based closed-loop reducing agent dosing control logic structure is shown schematically in FIG. 9. A LARMF target 78 corresponds to the holding zone 68 LARMF values, i.e., is arranged between the upper threshold 70 and the lower threshold 72. A PID controller 80 makes adjustment to the reducing agent dosing based on differences between the target value and the actual LARMF values until the actual LARMF values fall in the holding zone 68. The input signals 16 correspond to an open-loop reducing agent dosing. From the signals measured by the NOx sensor 20, variations 82 or changes in the NOx concentrations downstream of the SCR catalyst 12 are detected. Based on these measurements the calculation unit 64 determines the LARMF value and provides adjustment information.

Figure 10:
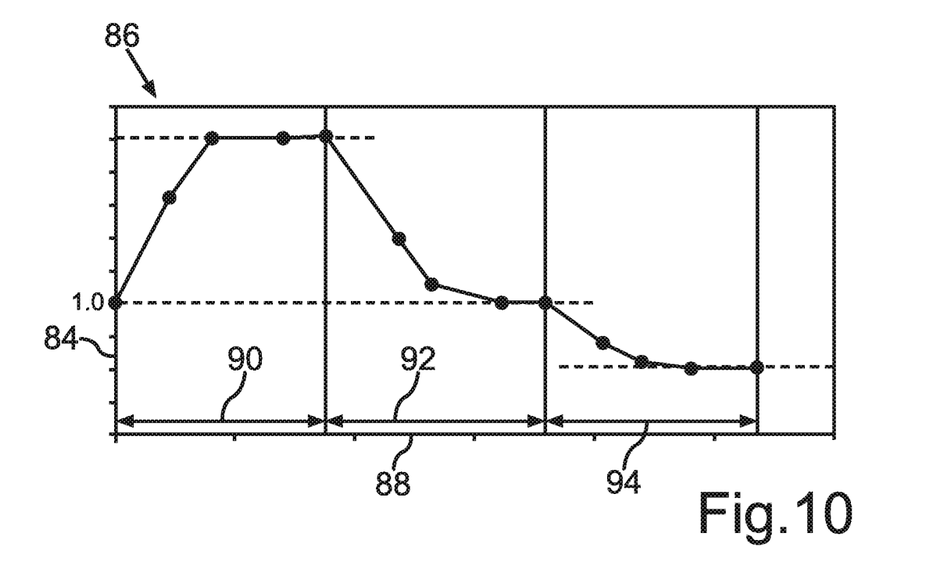
FIG. 10 illustrates examples of dosing correction factors applied in the closed-loop dosing control.

FIG. 10 illustrates the expected behavior for ammonia supply correction factors of LARMF-based reducing agent dosing with closed-loop under different ammonia supply scenarios. The correction factor is indicated on an ordinate of a graph 86 in FIG. 10, whereas the time in seconds is indicated on an abscissa 88. In a first scenario 90 an increasing correction factor is applied due to underdosing of ammonia. In a second scenario 92 the correction factor is reduced again as normal ammonia dosing is attained. In a third scenario 94 of ammonia overdosing the correction factor is further decreased to values below 1. Thus, normal ammonia dosing has a correction factor of 1, underdosing will result in a correction factor greater than 1, and overdosing in a correction factor below 1.

A total time for the sampling period to determine the LARMF value can in particular be about 10 minutes. Within this total sampling period τ the predetermined periods of time during which the moving median is calculated can be about 20 seconds. Thus, after 10 minutes of data sampling a LARMF value is generated and the dosing is adjusted accordingly until a new LARMF value is calculated and so on.

Data sampling preferably takes places if there are approximately steady state operating conditions. This avoids a situation where highly transient operating conditions exist which would have an unwanted influence on the detection accuracy.

LIST OF REFERENCE SIGNS 10 control assembly
12 SCR catalyst
14 dosing unit
16 input signals
18 controller
20 NOx sensor
22 tail pipe
24 graph
26 ordinate
28 abscissa
30 curve
32 curve
34 curve
36 graph
38 curve
40 curve
42 graph
44 curve
46 graph
48 curve
50 curve
52 graph
54 curve
56 ordinate
58 abscissa
60 correlation curve
62 evaluation unit
64 calculation unit
66 dosing compensation logic
68 holding zone
70 upper threshold
72 lower threshold
74 increasing dosing zone
76 decreasing dosing zone
78 target
80 PID controller
82 variations
84 ordinate
86 graph
88 abscissa
90 scenario
92 scenario
94 scenario

The invention claimed is:

1. A method for operating an exhaust gas system, the method comprising the steps of:
receiving a signal reading from a nitrogen oxide sensor over a total data sampling time period (τ), wherein the nitrogen oxide sensor measures a content of nitrogen oxides in exhaust gas flowing downstream of a catalytic device configured to diminish the content of nitrogen oxides in the exhaust gas;
obtaining a difference ($x_i - x_s$) between a sampled tail pipe nitrogen oxide concentration ($x_i$) and a median tail pipe nitrogen oxide concentration ($x_s$) repeatedly over the total data sampling time period;
determining a lumped average relative magnitude frequency (LARMF) by way of a first relationship, $$LARMF = \frac{1}{\tau}\int_0^\tau |x_i - x_s|dt;$$

establishing a second relationship between the lumped average relative magnitude frequency and a reduction in percent of reducing agent relative to a normal supply of the reducing agent; and adjusting said reduction of reducing agent relative to said normal supply in accordance with said second relationship.

2. The method according to claim 1, wherein a moving median is utilized as the median tail pipe nitrogen oxide concentration ($x_s$), which takes into account a series of predetermined periods of time.

3. The method according to claim 1, wherein a lower lumped average relative magnitude frequency threshold above zero and an upper lumped average relative magnitude frequency threshold are defined, and an amount of reducing agent to be supplied to the exhaust gas is varied if the total is below the lower threshold or above the upper threshold.

4. The method according to claim 3, wherein the lower lumped average relative magnitude frequency threshold is between 0.1 and 1, and the upper lumped average relative magnitude frequency threshold is between 0.9 and 1.5.

5. The method according to claim 4, wherein the lower lumped average relative magnitude frequency threshold is between 0.3 and 0.8, and the upper lumped average relative magnitude frequency threshold is between 1 and 1.4.

6. The method according to claim 4, wherein the lower lumped average relative magnitude frequency threshold is between 0.4 and 0.6, and the upper lumped average relative magnitude frequency threshold is between 1.2 and 1.3.

7. The method according to claim 3, wherein the amount of the reducing agent to be supplied to the exhaust gas is varied by a PID controller.

8. The method according to claim 1, wherein receiving the signal reading from the nitrogen oxide sensor occurs repeatedly in a range of 5 seconds to 60 seconds.

9. The method according to claim 8, wherein receiving the signal reading from the nitrogen oxide sensor occurs repeatedly in the range of 10 seconds to 30 seconds.

10. The method according to claim 8, wherein receiving the signal reading from the nitrogen oxide sensor occurs repeatedly for 20 seconds.

11. The method according to claim 1, wherein the total data sampling time period is in a range of 2 minutes to 20 minutes.

12. The method according to claim 1, wherein the total data sampling time period is in a range of 5 minutes to 15 minutes.

13. The method according to claim 1, wherein the total data sampling time period is 10 minutes.

14. The method according to claim 1, wherein the exhaust gas system is of a vehicle.

15. A control assembly for operating an exhaust gas system comprising:

an injector to supply an amount of a reducing agent to exhaust gas of the exhaust gas system of an engine, and a controller for executing stored instructions to:

receive a signal reading from a nitrogen oxide sensor over a total data sampling time period ($\tau$), wherein the nitrogen oxide sensor measures a content of nitrogen oxides in exhaust gas flowing downstream of a catalytic device configured to diminish the content of nitrogen oxides in the exhaust gas, determine a lumped average a relative magnitude frequency (LARMF) by way of a first relationship, $$LARMF = \frac{1}{\tau}\int_0^\tau |x_i - x_s|dt;$$

establish a second relationship between the lumped average relative magnitude frequency and a reduction in percent of reducing agent relative to a normal supply of the reducing agent; and adjust said reduction of reducing agent relative to said normal supply in accordance with said second relationship.

16. The control assembly according to claim 15, wherein the exhaust gas system is of a vehicle.

\* \* \* \* \*